March 31, 1964   W. M. THOMPSON   3,126,816
COMBINATION SHEAR AND BALER
Filed Sept. 26, 1960   5 Sheets-Sheet 1
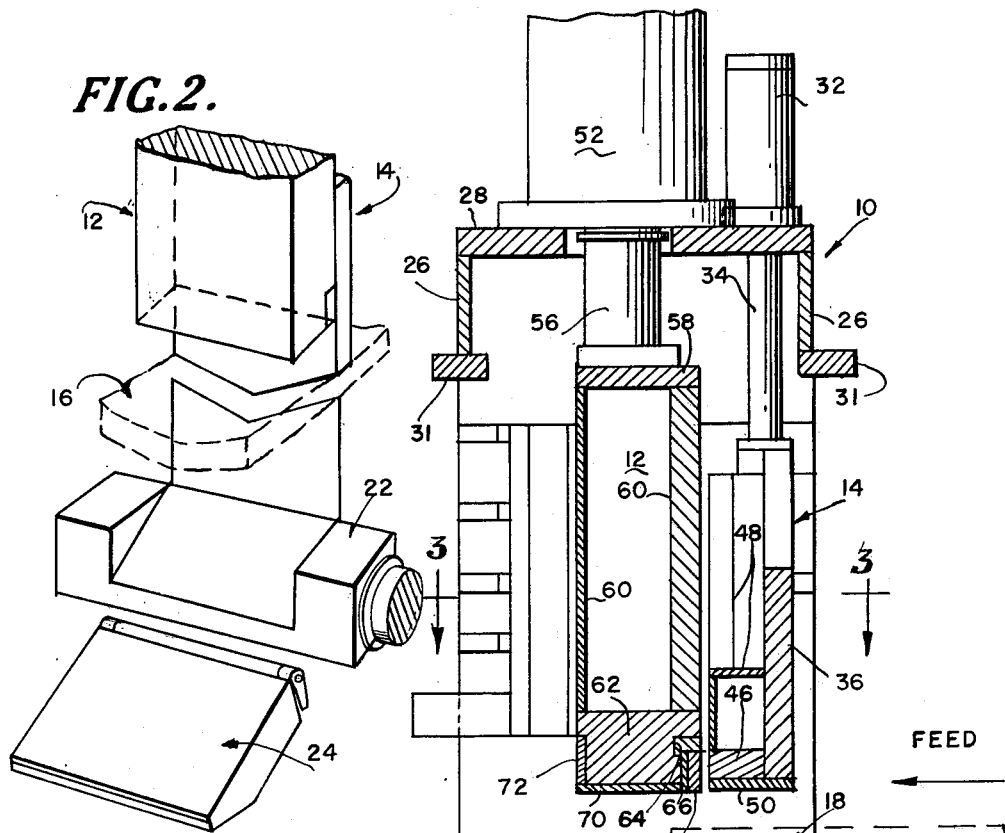
FIG.2.
FIG.1.
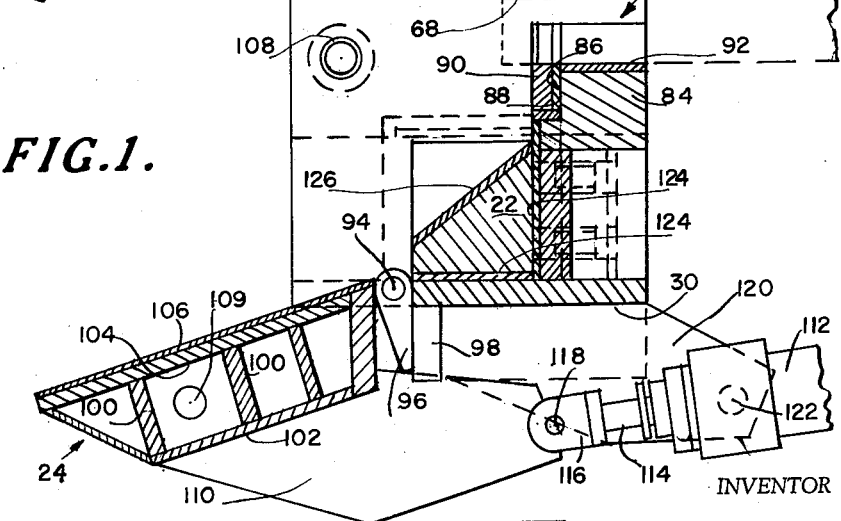
INVENTOR
WALLACE M. THOMPSON
BY Cushman, Darby & Cushman
ATTORNEYS March 31, 1964 W. M. THOMPSON 3,126,816
COMBINATION SHEAR AND BALER
Filed Sept. 26, 1960 5 Sheets-Sheet 2

INVENTOR
WALLACE M. THOMPSON
Cushman, Darby
& Cushman
ATTORNEYS

March 31, 1964 — W. M. THOMPSON — 3,126,816
COMBINATION SHEAR AND BALER
Filed Sept. 26, 1960 — 5 Sheets-Sheet 3

INVENTOR
WALLACE M. THOMPSON
BY Cushman, Darby & Cushman
ATTORNEYS

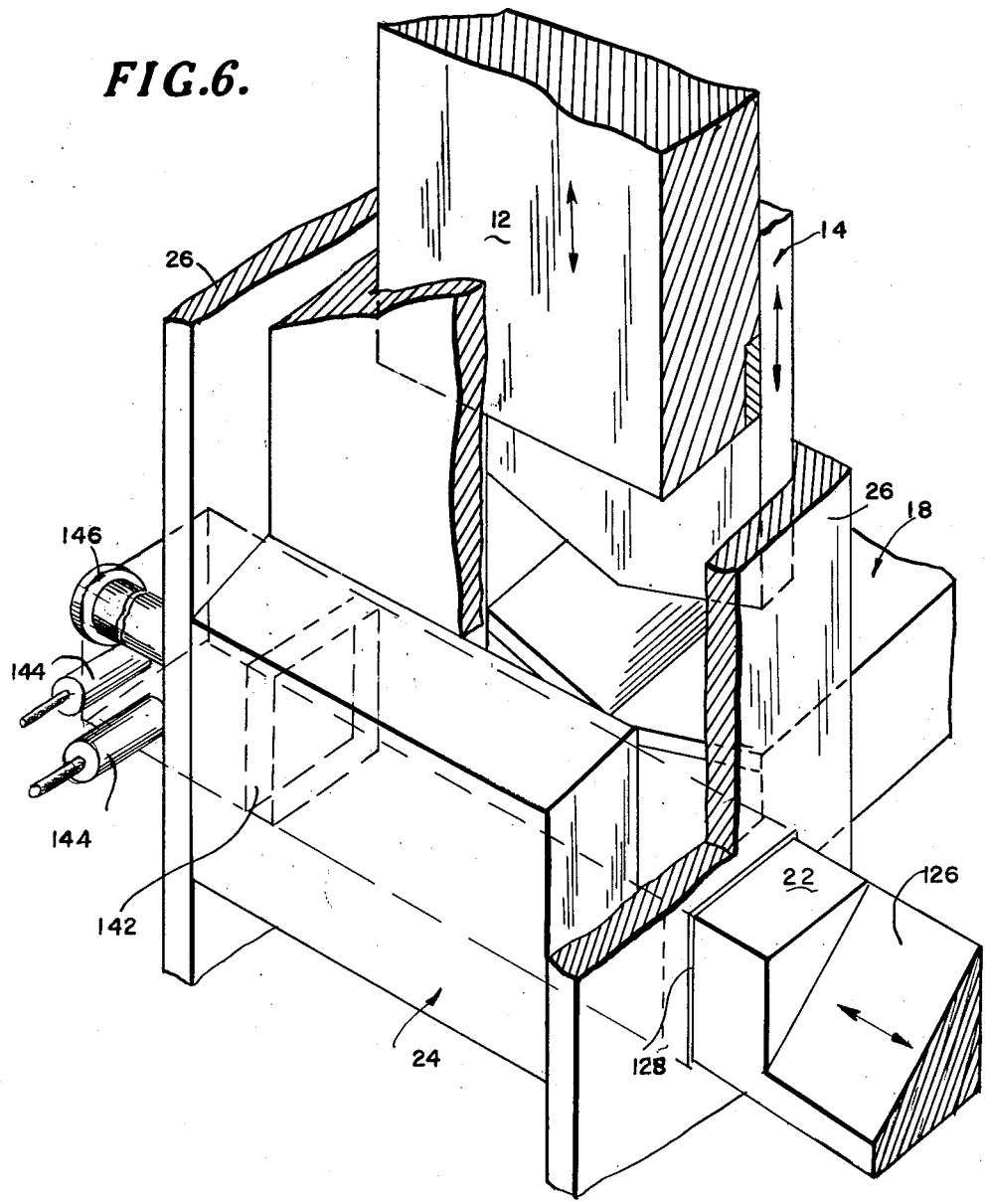

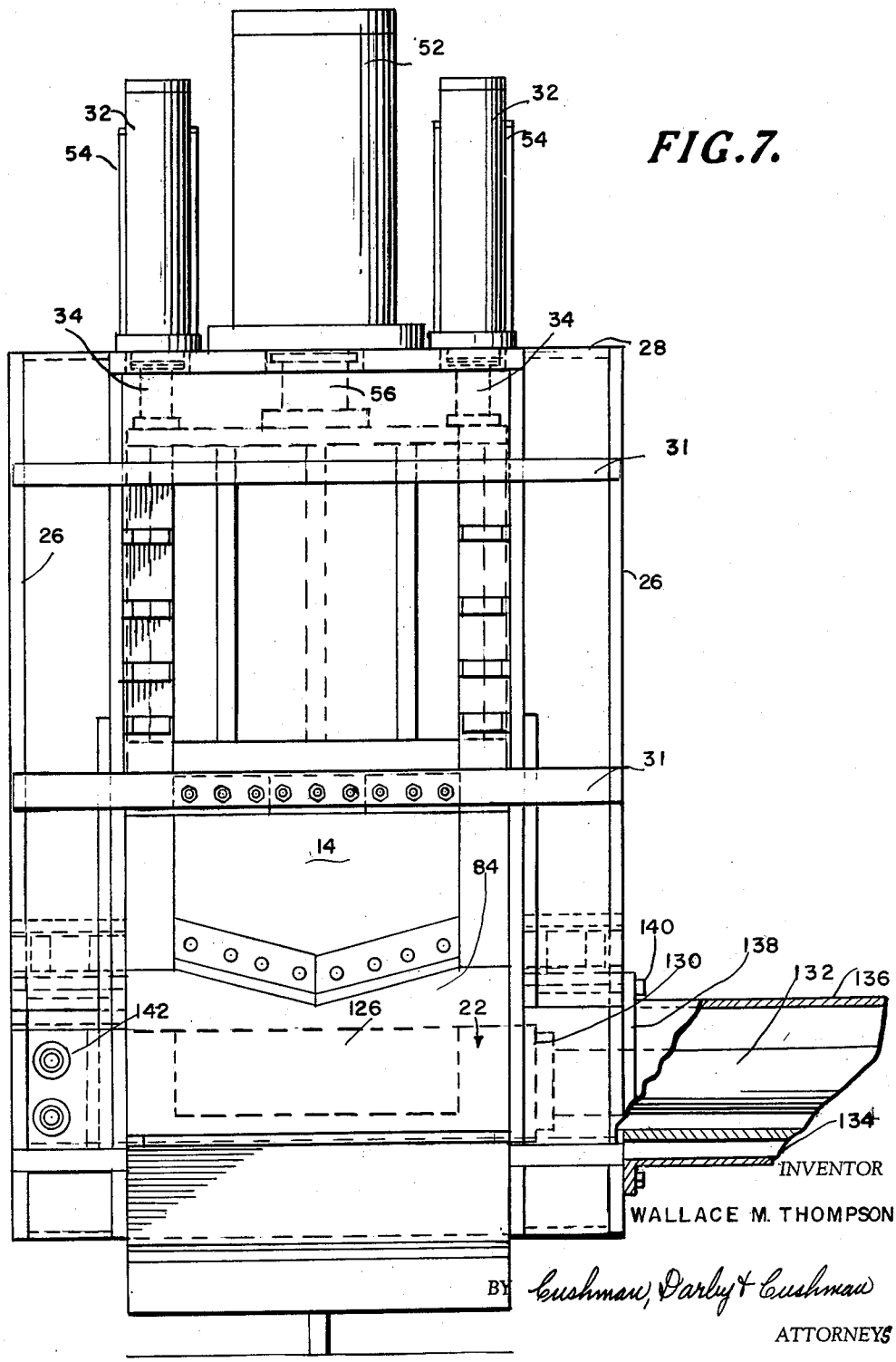

United States Patent Office 3,126,816
Patented Mar. 31, 1964

3,126,816
COMBINATION SHEAR AND BALER
Wallace M. Thompson, Cordele, Ga., assignor to Harris Foundry & Machine Co., Cordele, Ga., a corporation of Georgia
Filed Sept. 26, 1960, Ser. No. 58,247
2 Claims. (Cl. 100—98)

This invention relates to an apparatus for working scrap metal and the like, and has particular reference to an apparatus which may be used for both shearing and baling scrap metal, or alternatively for shearing or baling scrap metal.

Sheet metal scrap, such as automobile bodies, structural members and the like, is frequently cut up in shearing machines into manageable size pieces to facilitate handling and transportation thereof. Many times, such metal scrap is quite bulky even after being sheared, the volume of the cut up scrap still not being of an adequate density for economic handling and transportation. Consequently, it is desired to have the bulky metal scrap compacted or otherwise baled so as to provide a high density, manageable size volume of scrap metal to facilitate handling.

In conventional practice, the scrap metal is first sheared into manageable size pieces and then transferred by a suitable conveyor to a baling press wherein the scrap metal pieces are pressed to form a suitable bale.

Scrap metal installations thus require a plurality of machines for performing the sequential shearing and baling operations on the scrap metal. Such shearing, conveying and baling machines require an extensive capital outlay and generally require a time-consuming and expensive number of operations to the scrap metal.

An object of this invention is to obviate the shortcomings of prior art scrap metal working equipment by providing a combination scrap metal shearing and baling apparatus which may be used for shearing and baling the scrap metal, or, alternatively, for either baling or shearing alone.

Another object of this invention is to provide a shearing and baling apparatus wherein the scrap metal may be sheared and ejected from the apparatus, or the scrap metal may be sheared and subsequently baled in a baling chamber within the apparatus.

Still another object of this invention is to provide an apparatus for shearing and baling scrap metal wherein the top of the baling chamber is formed by the shearing head of the apparatus, and movable means are provided for baling the scrap metal in the baling chamber, or for ejecting the scrap metal from the apparatus without subsequent baling.

Still another object of this invention is to provide a combination shearing and baling apparatus which includes a vertically reciprocable shear head with a baling chamber disposed below the shearing plane of the apparatus and a horizontally reciprocable baling means movable into and out of the baling chamber, together with a back gate and a movable door, each of these parts forming walls of the baling chamber.

Further objects of this invention are to provide a combination shearing and baling apparatus which is relatively inexpensive and highly reliable for working scrap metal of various sizes as required in the scrap metal industry.

Further objects and advantages of this invention will become apparent when consideration is given to the specification, claims, and accompanying drawings, in which:

FIGURE 1 is a full section elevation view of the apparatus according to the invention;

FIGURE 2 is a schematic perspective view of a number of the features of the apparatus, as shown in FIGURE 1;

FIGURE 6 is a schematic perspective view of the apparatus in FIGURE 5; and

FIGURE 7 is a front elevation view of the apparatus in FIGURE 1.

Figure 4:
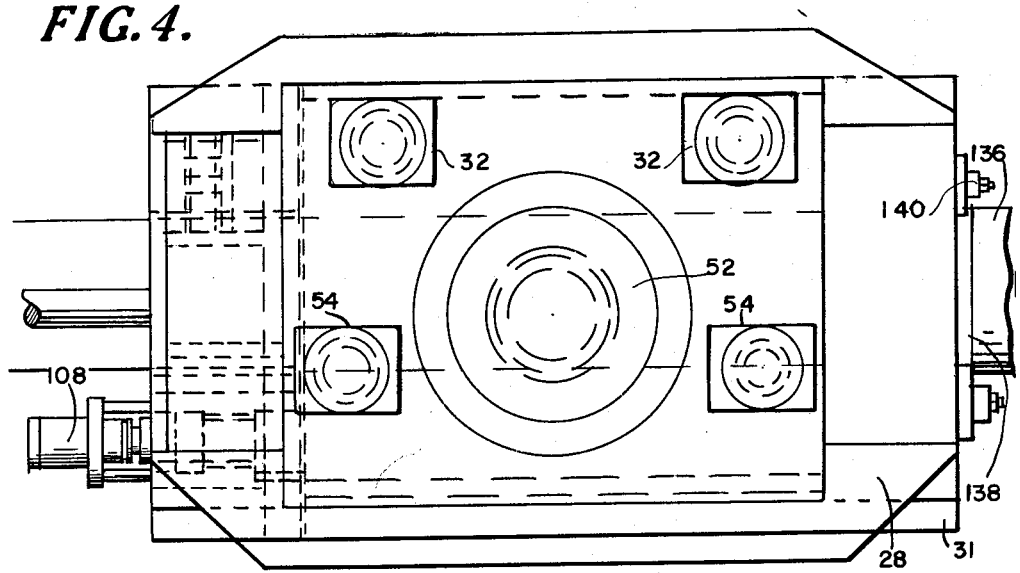
FIGURE 4 is a plan view of the apparatus in FIGURE 1.

Referring now to the drawing and particularly to FIGURES 1 to 4, the apparatus includes a frame 10 in which a vertically reciprocable shearing head 12 and a hold-down member 14 are mounted to shear the scrap metal 16 which is disposed on the feed bed 18. Below the feed bed 18 is a baling chamber 20 in which is disposed a horizontally reciprocable baling ram 22. Pivoted on the rear of the frame 10 is a back gate 24.

The frame 10 includes vertical structural members 26 which are joined together by top structural members 28, bottom structural members 30, and intermediate structural members 31.

Mounted above the top structural member 28 near the front or the infeed side of the frame 10 (FIGURES 1 and 4) are two double-acting hydraulic motors 32 operative to vertically reciprocate the hold-down member 14 into and out of the shearing position. Extending downwardly from the hold-down motors 32 are piston rods 34 to which the upper end of the hold-down member 14 is secured by conventional means.

Figure 3:
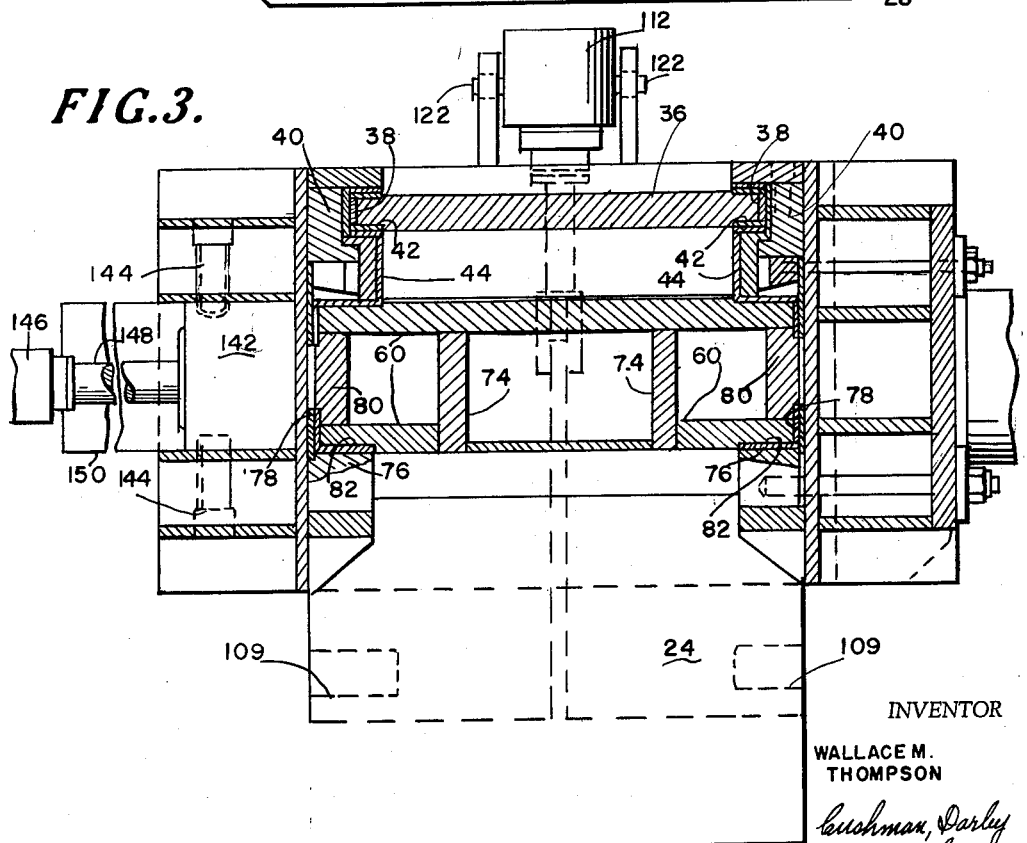
FIGURE 3 is a full section view taken along line 3—3 of FIGURE 1.

The hold-down member 14 includes a vertical plate 36 having side walls 38 which are received in guideways 40, as best seen in FIGURE 3. The side walls 38 and cooperating guideways 40 are provided with bearing plates 42 and 44, respectively, which minimize the sliding friction therebetween. Secured to the lower end of the vertical hold-down plate 36 is a hold-down block 46. Additional elements 48 are provided to ensure a rigid structure, as will be apparent to those skilled in the art. The bottom surface of the hold-down member 14 is generally V-shaped (FIGURE 7) and has liner plates 50 disposed thereon. The V-shaped bottom surface of the hold-down member 14 cooperates with the mating recessed feed bed 18 to properly secure the scrap metal 16 for the shearing operation.

Disposed rearwardly adjacent to the hold-down member 14 is a vertically reciprocable shear head 12. A single acting hydraulic motor 52 is mounted on the top structural member 28 in a manner similar to the hold-down motors 32. In this regard, the hydraulic shear motor 52 is disposed centrally of the sides of the frame 10. Two hydraulic return motors 54 cooperate with the hydraulic shear motor 52 to return the shear head 12 to its upward position, after having been moved downwardly by the force of the shear motor 52. A vertically reciprocable piston rod 56 extends downwardly from the shear motor 54 and is secured to the shear head 12 on a top plate 58 of the shear head 12. Suitable piston rods (not shown) extend downwardly from the motors 54, and are also secured to the top plate 58.

The shear head 12 is constructed of side plates 60 joined together by the top plate 58 and a lower shear block 62. The lower shear block 62 has a recessed front portion along its bottom, to which a shear retaining plate 66 is secured. The shear retaining plate 66 has a shear member 68 secured thereto. The bottom surface of the shear block 62 has a liner plate 70 secured thereto, and the back side of the shear block also includes a liner plate 72. Suitable structural members 74 complete the shear head construction.

Referring now to FIGURE 3, shear head 12 is disposed in guideways 76 in a manner generally similar to the guideways 40 and the side walls 38 of the hold-down member 14. Suitable bearing plates 78 are disposed along the sides 80 of the shear head 12, cooperating with the guideway bearing plates 82, to minimize the sliding friction therebetween.

The recessed feed bed 18 includes a V block 84, this feed bed 18 communicating with a suitable feeding means, such as conveyer, hopper, or the like (not shown) which moves the scrap metal 16 to a proper shearing position. The V block 84 has a recessed portion 86 along its inside upper edge, and disposed within this recessed portion 86 are retaining plates 88 to which a feed bed shear member 90 is properly secured. The feed bed shear member 90, of course, cooperates with the shear member 68 on the shearing head 12 to shear the scrap metal 16. In this regard, the required shearing force is minimized by virtue of the flat configuration of the shear member 68, and the V shape of the feed bed shear member 90. As with the other elements of the apparatus which are subjected to adverse wear, the V block 84 has liner plates 92 mounted thereon.

Figure 5:
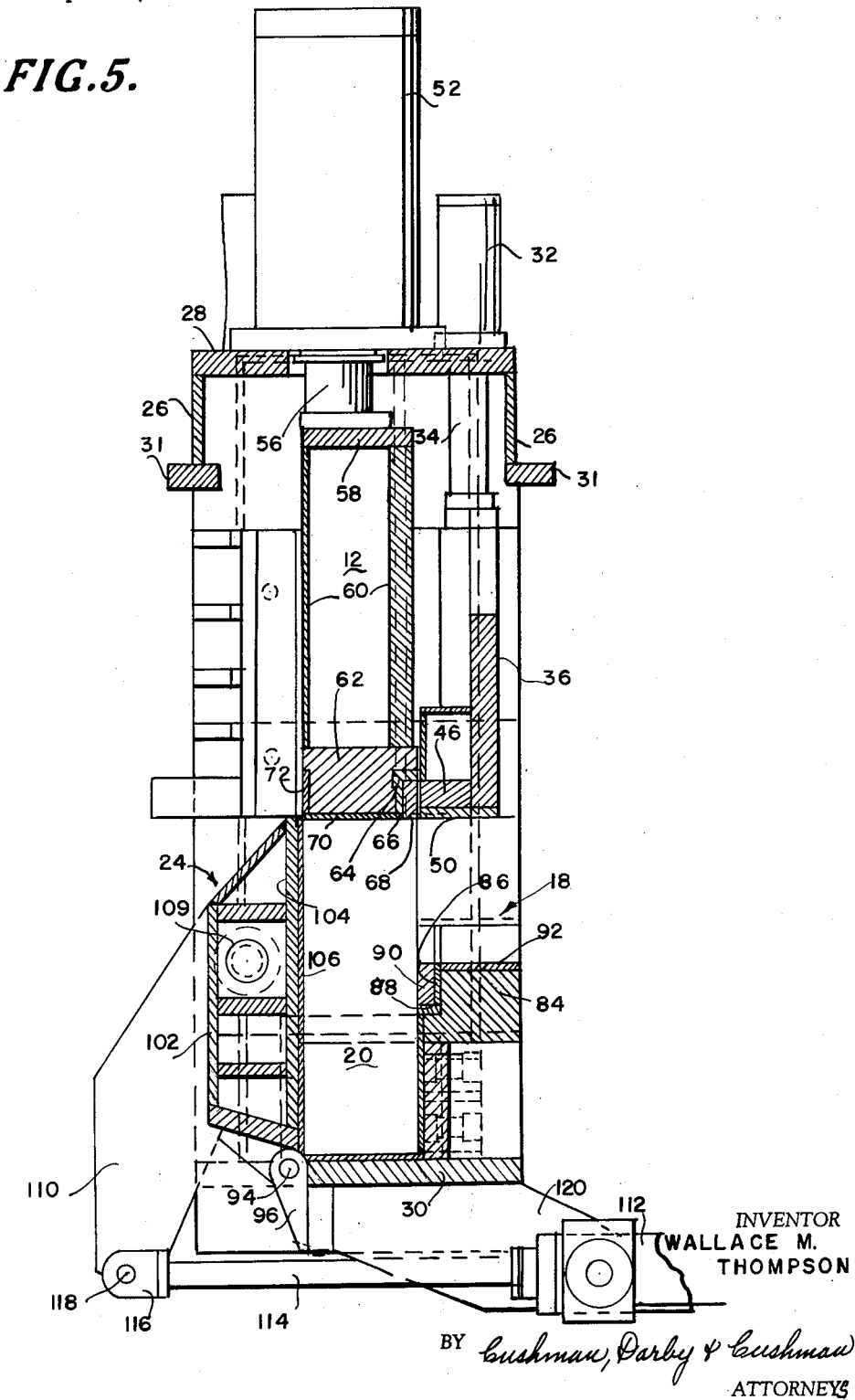
FIGURE 5 is a full section elevation view of the apparatus in FIGURE 1 but showing the apparatus in position for shearing and baling.

The rear wall of the frame 10 includes a back gate 24, which is pivotally secured on a horizontal shaft 94. Also cooperating with the back gate 24 along this pivot axis are a plurality of piano levers 96, which engage an abutting plate 98 when the back gate 24 is in its downward position, as shown in FIGURE 1. The back gate 24 is a built-up, generally trapezoidal construction of beams 100, which are disposed between the rear wall 102 and the front wall 104, the front wall having a liner plate 106 thereon. Two gate locks 108 are provided for engagement with the back gate 24 when pivoted to the closed position, as shown in FIGURE 5. Each gate lock 108 is a reciprocating double-acting hydraulic piston arrangement which moves into a side recess 109 of the back gate 24 to provide a supplementary locking means for the back gate 24.

Extending in a generally perpendicular direction from the rear wall 102 of the back gate 24 is a web plate 110. This web plate 110 provides a linkage to a double-acting hydraulic motor 112 which is secured thereto by the reciprocable piston rod 114 having a yoke 116 extending from its end. The web plate 110 has an aperture (not shown) therethrough which receives a pin 118 which extends through the yoke 116. This linkage thus provides for pivotal movement of the back gate 24 upon reciprocating movement of the piston rod 114 of the hydraulic motor 112, for moving the back gate 24 from its open position, in FIGURE 1, to its closed position in FIGURE 5. The hydraulic motor 112 is pivotally mounted on the underside of the apparatus 10 by a bracket 120, having apertures therethrough. The housing of the hydraulic motor 112 has lugs extending therefrom in a horizontal direction, cooperating with the apertures in the bracket 120 to provide pivotal movement of the piston rod 114 from the downward position, in FIGURE 1, to the generally horizontal position in FIGURE 5.

Disposed below the shear head 12 is a baling chamber 20, which is generally rectangular in construction when the back gate 24 is in its closed position, as will be seen in FIGURE 5, the back gate 24 defining the rear wall of the baling chamber 20. The baling chamber has liner plates 124 on its bottom and front walls.

The baling ram 22 is horizontally reciprocable into and out of this baling chamber 20. The baling ram 22 is of a generally rectangular construction but has a tapered top wall 126 along a portion of its length, intermediate its ram head end 128 and its rear end wall 130. The baling ram 22 has a rod 132 extending from its rear end wall 130, which is actuated by a hydraulic double-acting motor (not shown). As best seen in FIGURE 7, the baling ram 22 is movable wholly out of the side of the apparatus 10 and the baling chamber 20, being slidable on a track 134. Because of the relatively large stroke of the baling ram 22, the rod 132 is protected from the elements and workmen, by a housing 136 which extends about the path of travel of the rod 132, and is properly secured to the side of the apparatus 10 by a flange 138. Suitable bolts 140 join the flange 138 to the side of the apparatus 10.

On the side of the baling chamber 20 opposite the ramrod housing 136 is a door 142 which provides communication between the baling chamber 20 and the exterior of the apparatus 10. The door 142 is secured to the frame by hydraulically actuated bale dogs 144, and movable by a hydraulic cylinder 146, and a piston rod 148, on a suitable track 150. In this regard, the door 142 need be movable only to the extent to allow the baling ram 22 to eject a bale of scrap metal out of the baling chamber 20, and alternative door moving means may equally well be used.

Therefore, it will be best seen in FIGURE 6 that when the back gate 24 is in its closed position and the baling ram 22 is withdrawn from the apparatus 10, a baling chamber 20 is formed by the stationary front and bottom walls, the back gate 24 defining the rear wall, the ram head 128 defining one side wall and the door 142 defining the opposite side wall. The bottom surface of the shear head 12 defines the top wall of the baling chamber 20, when moved to its downward position.

When the back gate 24 is in its downward position, as shown in FIGURE 1, and the baling ram 22 is moved into the baling chamber 20, the apparatus 10 will not retain the sheared scrap metal, as the scrap metal will slide out of the rear of the apparatus 10, by virtue of the tapered top wall 126 of the baling ram 22.

*Operation*

Reference will now be made to the operation of the apparatus 10 during the different conditions of desired use.

Referring first to FIGURES 1 and 2, the apparatus 10 is shown with the essential elements disposed so that the apparatus 10 is used for shearing the scrap metal with no subsequent baling. The hold-down member 14 and the shear head 12 are in their upper positions, and the baling ram 22 is moved into the baling chamber 20. The back gate 24 is in its downward position, whereby communication is provided between the tapered top wall 126 and the exterior of the frame 10, and the door 142 is secured in its closed position by bale dogs 144.

The scrap metal 16 is conveyed on the recessed feed bed 18 from a feed hopper or the like (not shown). The double-acting hold-down motors 32 are then actuated, moving the hold-down member 14 into engagement with the scrap metal 16, holding the scrap metal 16 for subsequent shearing. After the hold-down member 14 is moved to its lowermost position, the shear motor 52 is actuated, moving the shear head downwardly and causing the scrap metal 16 to be sheared between the shear member 68 on the shear head 12 and the shear member 90 on the V block 84. The sheared scrap metal falls onto the tapered top wall 126 of the baling ram 22, and out of the rear of the apparatus 10 the hold-down member 14 is returned to its upper position by the motors 32, and the shear head 12 is moved to its upper position by motors 54. During this cycle the baling ram 22, the back gate 24 and the door 142 have not been moved from their previous-described positions. The apparatus is then in position for the next shearing cycle.

Referring now to FIGURES 5 and 6, the apparatus 10 is in position for both shearing and baling the scrap metal, or for baling alone.

The back gate 24 is pivoted to its closed position by the hydraulic motor 112, and locked into position by the gate locks 108. The baling ram 22 is withdrawn from the baling chamber 20 and the door 142 is moved to its closed position by motor 146 and the door 142 is then secured by bale dogs 144.

The hold-down member 14 is actuated along with the shear head 12, as previously described, and the sheared scrap metal, instead of falling out of the rear of the apparatus 10, falls into the baling chamber 20. After a predetermined quantity of scrap metal is sheared, the shear head 12 is moved to a position defining the upper surface of the closed baling chamber 22. The baling ram 20 is then actuated and, upon moving into the baling chamber 22, the ram head 128 compacts the sheared scrap metal against the walls of the baling chamber 20, forming a bale of sheared scrap metal. After the bale is suitably formed, the door 142 is opened by releasing the bale dogs 144 and actuating cylinder 146, the baling ram 22 then continuing to move towards the opposite side of the apparatus 10, ejecting the bale of scrap metal.

It is apparent that if the shearing operation is unnecessary, as for example, where the metal is already of a suitably small size, the metal may merely be moved into the baling chamber 20 and subsequently formed into a bale, as previously described.

Suitable modifications may be made to the invention without departing from the scope thereof. For instance, the gate 24, the baling ram 22, and the door 142 may be disposed on different sides of the frame 10 than shown in the preferred embodiment of the invention. The door 142, of course, may be pivotally secured to the side of the frame 10. Additionally, a safety hood may be placed above the rear frame opening for the back gate 24, to ensure that the sheared scrap metal will not provide a hazard when the apparatus is used for shearing alone (FIGURES 1 and 2).

It will, therefore, be seen that there has been provided by this invention a structure in which the various objects set forth, together with many practical advantages, are successfully achieved.

As various possible embodiments may be made of the mechanical features without departing from the scope thereof, it is to be understood that all matters herein set forth or shown in the accompanying drawings is to be interpreted in an illustrative, and not in a limiting sense.

I claim:

1. Apparatus for working scrap metal comprising: a vertically movable shear head having a shear blade along a lower edge thereof; a horizontal feed bed terminating in a fixed shear blade cooperating with said movable shear blade; means including said shear head defining a baling chamber beneath said head for receiving scrap metal sheared by said blades; a baling ram movable inwardly of said chamber transversely of said bed for compacting scrap metal therein; and a gate movable between an operative closed baling position wherein it defines the wall of said chamber opposite said fixed shear blade and an open position wherein said apparatus serves only as a shear, said ram, rearwwardly of its front face, having an inclined upper surface defining, when said ram is advanced and said gate is in said open position, at least a portion of a chute for scrap metal sheared by said blades.

2. The structure defined in claim 1 wherein the gate is inclined downwardly and outwardly in its open position to define another portion of the chute.

References Cited in the file of this patent

UNITED STATES PATENTS

| | | |
|---|---|---|
| 1,121,571 | Sheppard | Dec. 15, 1914 |
| 2,644,351 | Golay | July 7, 1953 |
| 2,780,989 | Guy | Feb. 12, 1957 |

FOREIGN PATENTS

| | | |
|---|---|---|
| 201,976 | Austria | Feb. 10, 1959 |
| 218,961 | Australia | Dec. 5, 1958 |